(12) United States Patent
Matviya et al.

(10) Patent No.: US 8,048,528 B2
(45) Date of Patent: *Nov. 1, 2011

(54) CELLULAR COAL PRODUCTS

(75) Inventors: Thomas M. Matviya, McKees Rocks, PA (US); Darren K. Rogers, Morristown, TN (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/142,960

(22) Filed: Jun. 2, 2005

(65) Prior Publication Data

US 2005/0223632 A1   Oct. 13, 2005

Related U.S. Application Data

(63) Continuation-in-part of application No. 10/810,899, filed on Mar. 29, 2004, which is a continuation of application No. 10/046,436, filed on Jan. 14, 2002, now Pat. No. 6,814,765, which is a continuation-in-part of application No. 09/453,729, filed on Dec. 2, 1999, now abandoned.

(60) Provisional application No. 60/587,043, filed on Jul. 13, 2004.

(51) Int. Cl.
*B32B 9/00* (2006.01)

(52) U.S. Cl. ...................................................... 428/408

(58) Field of Classification Search .................. 428/408; 423/445 R, 447.1; 429/27; 264/29.1
See application file for complete search history.

(56) References Cited

U.S. PATENT DOCUMENTS

| 3,018,227 A | 1/1962 | Baum et al. |
| 3,111,396 A | 11/1963 | Ball |
| 3,185,635 A | 5/1965 | Creglow |

(Continued)

FOREIGN PATENT DOCUMENTS

GB    1489690    10/1977

(Continued)

OTHER PUBLICATIONS

Blaschke (Clean coal-preparation barriers in Poland; Applied Energy 74 (2003) 343-348).*

(Continued)

*Primary Examiner* — David Sample
*Assistant Examiner* — Daniel H Miller
(74) *Attorney, Agent, or Firm* — Philip D. Lane

(57) ABSTRACT

According to the present invention there is provided coal-based cellular or porous products, also referred to herein as "carbon foams", having a density of preferably between about 0.1 g/cm$^3$ and about 0.8 g/cm$^3$ and most preferably between about 0.3 and about 0.4 g/cm$^3$ that are produced by the controlled heating of coal particulate preferably up to ¼ inch in diameter in a "mold" and under a non-oxidizing atmosphere. The coal-based cellular or porous products of the present invention have ash contents typically greater than about 1%. More typically these coal-based cellular or porous products have ash contents greater than about 3%, with ash contents in the range of about 7% to 15% being most typical. The ash residue remaining after essentially complete combustion/oxidation of these coal-based cellular or porous products is predominately composed of oxides of aluminum and silicon. Additionally, the cellular coal-based products of the present invention have relatively low overall B.E.T. surface areas. Such surface areas are typically less than about 5 m$^2$/g and are commonly in the range of about 1 m$^2$/g to about 2 m$^2$/g.

7 Claims, 2 Drawing Sheets

Gas Release

Time

U.S. PATENT DOCUMENTS

| | | | |
|---|---|---|---|
| 3,302,999 | A | 2/1967 | Mitchell |
| 3,309,437 | A | 3/1967 | Harnett |
| 3,754,876 | A | 8/1973 | Pennington et al. |
| 4,127,391 | A | 11/1978 | Koppelman |
| 4,128,401 | A | 12/1978 | Powell et al. |
| 4,432,773 | A | 2/1984 | Euker et al. |
| 4,475,924 | A | 10/1984 | Meyer |
| 4,632,731 | A | 12/1986 | Bodle et al. |
| 4,668,244 | A | 5/1987 | Nakamura et al. |
| 4,849,021 | A | 7/1989 | Nakai et al. |
| 5,302,634 | A * | 4/1994 | Mushovic .................. 523/219 |
| 5,705,139 | A | 1/1998 | Stiller et al. |
| 5,888,469 | A | 3/1999 | Stiller et al. |
| 6,024,899 | A | 2/2000 | Peng et al. |
| 6,033,506 | A * | 3/2000 | Klett ........................ 156/78 |
| 6,183,854 | B1 | 2/2001 | Stiller et al. |
| 6,241,957 | B1 | 6/2001 | Stiller et al. |
| 6,346,226 | B1 | 2/2002 | Stiller et al. |
| 6,506,354 | B1 | 1/2003 | Stiller et al. |
| 6,544,491 | B1 | 4/2003 | Stiller et al. |
| 6,749,652 | B1 | 6/2004 | Rogers |
| 6,797,251 | B1 * | 9/2004 | Bennett et al. ............ 423/445 R |
| 6,814,765 | B1 * | 11/2004 | Rogers ....................... 44/620 |
| 6,899,970 | B1 * | 5/2005 | Rogers et al. ................ 429/27 |
| 2003/0070350 | A1 | 4/2003 | Rogers et al. |
| 2004/0079628 | A1 | 4/2004 | Eatough et al. |
| 2004/0177549 | A1 | 9/2004 | Rogers |
| 2004/0180187 | A1 | 9/2004 | Rogers |
| 2004/0228789 | A1 | 11/2004 | Stiller et al. |

FOREIGN PATENT DOCUMENTS

| | | | |
|---|---|---|---|
| JP | 61270205 | | 11/1986 |
| JP | 08112876 | | 5/1996 |
| WO | WO 02/18272 | * | 3/2002 |

OTHER PUBLICATIONS

Kirk-Othmer, Encyclopedia of Chemical Technology, 4th Edition, 1993, pp. 454-455, vol. 6, John Wiley & Sons, Inc. NY.

Ullmanns Enzyklopädie Der Technischen Chemie, "Kohle, Schwelung und Verkokung von Braunkohle", 1977, pp. 496-496, Table 4, vol. 14, Weiheim (DE), XP002390463.

McGraw-Hill Encyclopedia of Science and Technology, "Coke", 1994, pp. 121-123, vol. 4, McGraw-Hill, New York (USA), XP002390545.

Kiser and Wombles, Developing Coal Tar/Petroleum Pitches, power point presentation, date unknown, from www.koppers.com/docs/White_Papers/KOPHTC_TMS00_DEV_PETROL.ppt.

* cited by examiner

CELLULAR COAL PRODUCTS

CROSS-REFERENCE TO RELATED APPLICATIONS

This application is a continuation-in-part of and claims priority to co-pending U.S. patent application Ser. No. 10/810,899, filed Mar. 29, 2004, which is a continuation of U.S. patent application Ser. No. 10/046,436, filed on Jan. 14, 2002, now U.S. Pat. No. 6,814,765, which is a continuation-in-part of U.S. patent application Ser. No. 09/453,729, filed Dec. 2, 1999, now abandoned, each application is herein specifically incorporated by reference in its entirety. This application claims priority to U.S. Provisional Patent Application No. 60/587,043, filed Jul. 13, 2004, herein specifically incorporated by reference in its entirety.

FIELD OF THE INVENTION

The present invention relates to cellular coal products produced from coal powder. Products utilizing the coal-based porous products are also described.

BACKGROUND OF THE INVENTION

Sophisticated processes have been developed for the production of cellular foamed carbon products. Such processes often involve the use of blowing agents and the application of very high pressures in the fabrication process, and many use highly sophisticated starting materials. These materials, while very lightweight and demonstrating superior strength, tend to be relatively costly, either due to the nature of their starting materials and/or the complexity of their fabrication processes.

There exists a wide and varied class of requirements for low-density materials in the construction, aerospace, transportation, metal processing and other industries for which low-density materials are constantly being developed. Many of these materials exhibit properties such as fire resistance that make them uniquely suited to their end use application. In many applications, however, the aforementioned relatively high cost, low-density materials cannot be used because the final application will simply not justify their relatively high cost.

Feed-stocks to these sophisticated processes for the production of cellular foamed carbon products have included pitches, synthetic polymers, coal extracts, and coals. It is known that commercial pitches commonly have ash contents of less than about 0.5% maximum and for some pitches less than about 0.3% maximum. Synthetic pitches may have ash contents even lower than commercial pitches with values less than 20 ppm being provided by at least one manufacturer. Synthetic polymers would be expected to exhibited ash contents at least as low as those of synthetic pitches, and possibly even lower. Coal extracts have been indirectly taught to have no ash content as the ash component of the extracted coal is directly taught to remain with the non-soluble portion of the extracted coal. Commonly, bituminous coals have ash contents in the about 5% to about 10% range (as determined by ASTM Test Method D 3174, "Ash in the Analysis Sample of coal and Coke", or other functionally equivalent test method). Coals exhibiting higher ash contents are well-known. Such higher ash contents may be at any value greater than about 10%. Such higher values may be attributed to the inherent properties of the coal and/or to the manner and care with which the coal is mined. Coals having ash contents in the range of about 2% to about 5% are usually available but typically from only a limited number of suppliers at best. Such lower ash values can be attributed to the inherent properties of the coal, careful mining procedures, and/or to readily available coal washing techniques. Coals having ash contents of about 1% to about 2% are known but are relatively uncommon. Coals having ash contents of less than about 1% are relatively rare. Some advanced coal cleaning technologies may have the capability of reducing coal ash contents to less than about 2% but such technologies are not generally in common use and are typically expensive and/or difficult to practice. It should be noted that all percentage ash contents cited in this specification are mass-based.

SUMMARY OF THE INVENTION

The coal-based cellular or porous carbons, otherwise known as carbon foams, of the present invention have ash contents greater than about 1%. More typically these coal-based cellular or porous products have ash contents greater than about 3%, with ash contents in the range of about 7% to 15% being most typical. The ash residue remaining after essentially complete combustion/oxidation of these carbon foams is predominately composed of oxides of aluminum and silicon. Additionally, the cellular coal-based products of the present invention have relatively low overall B.E.T. surface areas. Such surface areas are typically less than about 5 m$^2$/g and are commonly in the range of about 1 m$^2$/g to about 2 m$^2$/g.

The coal-based cellular or porous products of the present invention are coal-based cellular or porous products, also referred to herein as "carbon foams", having a density typically between about 0.1 g/cm$^3$ and about 0.8 g/cm$^3$ and more typically between about 0.3 and about 0.4 g/cm$^3$ that are produced by the controlled heating of coal particulate preferably up to ¼ inch in diameter in a "mold" and under a non-oxidizing atmosphere. The predominate pore size of the carbon foams of the present invention are typically less than about 300μ although pore sizes can range up to at least about 500μ.

The porous carbon material, or carbon foams, of the present invention can exhibit compressive strengths of up to about 4000 psi at densities of between about 0.3 and about 0.4 g/cm$^3$ or 19 to 25 lb/ft$^3$ Other properties of such carbon foams can be tensile strengths of between about 300 and 1000 psi, shear strengths in the range of about 300 psi and impact resistances of between about 0.3 and 0.4 ft-lbs/in$^2$ as measured by Izod impact on a notched, 0.5 square inch cross-section sample.

DETAILED DESCRIPTION

Figure 1:
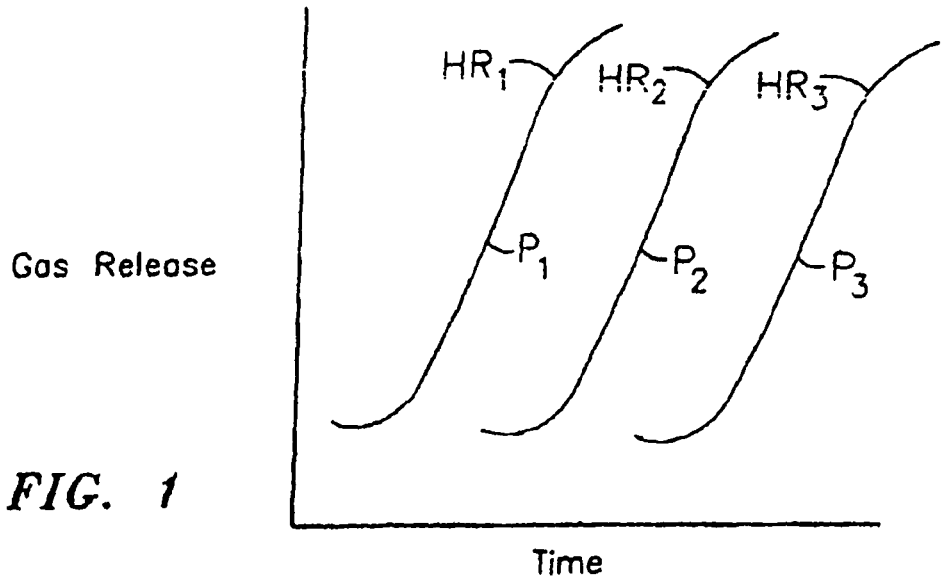
FIG. 1 is a graph of showing the general relationship between gas evolution and time/temperature at various operating pressures and temperatures for the process of the present Invention.

ASTM standards DD5515-97, "Standard Test Method for the Determination of Swelling Properties of Bituminous Coal" and D720-91 "Standard Test Method for Free Swelling Index of Coal" both define conditions for measuring the inherent property of coals to "swell" upon heating in an uncontrolled combustion situation. An aspect of the invention takes advantage of this property of coals to swell by controllably "swelling" a coal to obtain a highly useful, low density, cellular carbon product having properties that differentiate this cellular carbon product, which can also be referred to as a carbon foam, from other cellular carbon products.

According to an aspect of present invention, a preformed, low density, i.e., from about 0.1 to about 0.8 g/cm$^3$, preferably from about 0.2 to about 0.6 g/cm$^3$ and most preferably from about 0.3 to about 0.4 g/cm$^3$, cellular product, also referred to as a carbon foam, is disclosed. The cellular product is characterized as having a B.E.T. surface area less than about 5 m$^2$/g and typically in the range of about 1 m$^2$/g to about 2 m$^2$/g. Additionally, the cellular product has an ash content and ash constituents reflecting the coal from which such carbon foams are produced.

This carbon foam may be produced from powdered coal particulate preferably less than about ¼ inch in diameter by the controlled heating of the powdered coal in a "mold" under a non-oxidizing atmosphere. The coal used to produce the cellular product may include bitumen, anthracite, or even lignite, or blends of these coals, that exhibit a "free swell index" as determined by ASTM D720 of between about 3.5 and about 5.0, but are preferably bituminous, agglomerating coals that have been comminuted to an appropriate particle size, preferably to a fine powder below about −60 to −80 mesh. Additionally, the coal used to produce the cellular product of the present invention may possess all or at least some of the following characteristics: 1) a volatile matter content (dry, ash-free basis) of between about 35 and about 45% as defined by ASTM D3175, "Test Method for Volatile Matter in the Analysis of Coal and Coke"; 2) a fixed carbon (dry basis) between about 50 and about 60% as defined by ASTM D3172, Practice for Proximate Analysis of Coal and Coke"; 3) a Gieseler initial softening temperature of between about 380° C. and about 400° C. as determined by ASTM D2639, Test Method for Plastic Properties of Coal by the Constant-Torque Gieseler Plastometer"; 4) a plastic temperature range above about 50° C. as determined by ASTM D2639; 5) a maximum fluidity of at least 300 ddpm (dial divisions per minute) and preferably greater than about 2000 ddpm as determined by ASTM D2639; 6) expansion greater than about 20% and preferably greater than about 100% as determined by Amu Dilatation; 7) vitrinite reflectance in the range of from about 0.80 to about 0.95 as determined by ASTM D2798, "Test Method for Microscopical Determination of the Reflectance of Vitrinite in Polished Specimens of Coal"; 8) less than about 30% inert maceral material such as semifusinite, micrinit, fusinite, and mineral matter as determined by ASTM D2798; and 9) no significant oxidation of the coal (0.0 vol % moderate or severe oxidation) as determined by ASTM D 2798 and non-maceral analysis. The low softening point (380-400° C.) is important so that the material softens and is plastic prior to volatilization and coking. The large plastic working range or "plastic range" is important in that it allows the coal to flow plastically while losing mass due to any significant volatilization and foaming. Vitrinite reflectance, fixed carbon content and volatile matter content are important in classifying these coals used to produce the cellular product as "high volatile" bituminous coals. Such coals provide optimum results in the process used to produce the carbon foams of the present invention.

Thus a coal particulate starting material characterized as a high-volatile bituminous coal containing from about 35% to about 45% by weight (dry, ash-free basis) volatile matter, as determined by ASTM D3175, typically provides for optimum results in accordance with the described process for the production of the present invention. The various parameters derived from the Gieseler plasticity evaluations form a highly important set of characteristics of the starting material coal if optimum products are to be obtained. Thus, a softening point in the range of from about 380° C. to about 400° C., a plastic range of at least about 50° C. and preferably between about 75 and 100° C., and a maximum fluidity of at least several hundred and preferably greater than 2000 ddpm (dial divisions per minute) are important factor to consider in the production of the present invention. Accordingly, in order to obtain the carbon foams exhibiting the properties described herein, the coal starting material is typically a high volatile bituminous coal having a softening point as just described and a plastic range on the order of above about 50° C. all with the indicated Gieseler fluidity values described. Exhibition of Amu dilatation values greater than about 20% and preferably above about 100% when combined with the foregoing characteristics provide indications of a highly useful high volatile bituminous coal starting material.

The cellular coal-based products of the present invention described herein are semi-crystalline or more accurately turbostratically-ordered and largely isotropic i.e., demonstrating physical properties that are approximately equal in all directions. The cellular coal based products of the present invention typically exhibit pore sizes on the order of less than 300µ although pore sizes of up to 500µ are possible within the operating parameters of the process described. The thermal conductivities of the cellular coal based products are generally less than about 1.0 W/m/° K Typically, the carbon foams of the present invention demonstrate compressive strengths on the order of from about 2000 to about 6000 psi at densities of from about 0.4 to about 0.5 g/cm$^3$. Additionally, the cellular coal-based products of the present invention have relatively low overall B.E.T. surface areas. Such surface areas are typically less than about 5 m$^2$/g and are commonly in the range of about 1 m$^2$/g to about 2 m$^2$/g.

The cellular coal-based products of the present invention described herein are carbon foams. Carbon foams are materials of very high carbon content that have appreciable void volume. In appearance, excepting color, carbon foams can resemble readily available commercial plastic foams. As with plastic foams, the void volume of carbon foams is located within numerous empty cells. The boundaries of these cells are defined by the carbon structure. These cells typically approximate spheres or ovoids of regular, but not necessarily uniform, size, shape, distribution, and orientation. The void volumes in these cells typically connect directly to neighboring void volumes. Such an arrangement is referred to as an open-cell foam. The carbon in these foams forms a structure that is continuous in three dimensions across the material. Typically, the cells in carbon foams are of a size that is readily visible to the unaided human eye. Also, the void volume of carbon foams is such that it typically occupies much greater than one-half of the carbon foam volume.

The regular size, shape, distribution, and orientation of the cells within carbon foam readily distinguish this material from other materials such as metallurgical cokes. The void volumes within cokes are typically of spherical or ovoid shape and of random size, distribution, and orientation. That is, in cokes, some void volumes can be orders of magnitude larger than others. It is also not uncommon that the overlapping of void volumes in cokes results in significant distortions in the void shape. These distortions and large void volumes can even lead to a product that has limited structural integrity in all except smaller product volumes. That is, it is not uncommon for coke to be friable and larger pieces of coke to readily break into smaller pieces with very minimal handling. Such breakage is not exhibited by carbon foams. Also, a given sample of coke can exhibit both open and closed-cell void volumes. This is in contrast to a typical carbon foam which will primarily exhibit an open cell structure.

Although not specifically required, it is generally advisable for an embodiment of the invention that the coal starting material exhibit the previously specified free swell index of between about 3.5 and about 5.0 and preferably between about 3.75 and about 4.5. Selection of starting materials within these parameters was determined by evaluating a large number of coals characterized as ranging from high to low volatile coals. In general, it has been found that bituminous coals exhibiting free swell indexes within the previously specified ranges provided carbon foam products in the form of the lowest calcined foam densities and the highest calcined foam specific strengths (compressive strength/density). Such bituminous coals that also possess the foregoing set of properties, high volatile content (35% to 45% by weight), large plastic range (at least about 50° C.), etc. and are thus characterized as high volatile bituminous coals, are useful starting materials of the process used to produce the present invention. Coals having free swell indices too far below the specified preferred ranges may not agglomerate properly leaving a powder mass or sinter, but not swell or foam, while coals exhibiting free swell indices too far above these preferred ranges may heave upon foaming and collapsed upon themselves leaving a dense compact.

The cellular coal based products of the present invention are produced at yields typically greater than about 10 percentage points higher than those yields that would be expected based on the fixed carbon content of the coal starting material. The coals used as starting materials for the present invention are taught to characteristically have a volatile matter content (dry, ash-free basis) between about 35 and about 45% as defined by ASTM D3172, Practice for Proximate Analysis of Coal and Coke". Accordingly, such coals would have a fixed carbon content (dry, ash-free basis) between about 55 and about 65%. Therefore the mass-based cellular coal product yield (dry, ash-free basis), with respect to the mass of starting coal material would be expected to be about 65 to about 75%. Therefore, the cellular coal products produced using coals of typical ash content (i.e. 5 to 10% ash, dry basis) would be expected to exhibit ash contents in the range of about 7 to about 15%. The ash contents of cellular coal products would be expected to be greater than about 15% if such products were produced using coals having ash contents of greater than about 10%. Cellular coal products produced using coals of lower ash content (i.e. 2 to 5% ash, dry basis) would be expected to exhibit ash contents in the range of about 3 to about 7%. Cellular coal products produced using coals of still lower ash content (i.e. 1 to 2% ash, dry basis) would be expected to exhibit ash contents in the range of about 1 to about 3%.

Generally, for coals, cokes, and by extension, cellular coal based products, analysis of the ash residue remaining after performance of a test method such as ASTM Test Method D 3174 (or other functionally equivalent test method wherein the carbon content of the sample is removed by essentially complete combustion/oxidation of the carbon at high temperatures in air), shows the ash, i.e. the ash residue, to be composed, on a mass basis, predominately of oxides of aluminum and silicon.

The ash content of the cellular coal based products of the present invention are expected to be different than those of the carbon foams produced from other starting materials. For example, typical commercial pitches have maximum ash contents of less than 0.8%, most commonly less than 0.5%, and for some pitches less than 0.3%. Mesophase pitch contents can be even lower. Pitch-based carbon foam yields may be expected to be in the range of about 50% to about 80%. Therefore the ash content of such carbon foams is expected to be less than 2% and more typically less than 1%. Synthetic pitches may have ash contents even lower than commercial pitches with values less than 20 ppm. Synthetic polymers would be expected to exhibited ash contents at least as low as those of synthetic pitches, and possibly even lower. Therefore, even if the carbon foam yields from such synthetic feed-stocks were only about 10% (and it can be reasonably expected that such yields would be minimally greater than 20%, and most likely greater than 50%), the resultant carbon foam ash content would most likely be less than about 0.01%. Coal extracts have been indirectly taught to have no ash content as the ash component of the extracted coal is directly taught to remain with the non-soluble portion of the extracted coal. Therefore any carbon foam produced from such extracts would reasonably be expected to have essentially zero ash content.

A method for production of the carbon foam of the present invention comprises: 1) heating a high volatile bituminous coal particulate of preferably small (i.e., less than about ¼ inch particle size) in a "mold" and under a non-oxidizing atmosphere at a heat up rate of from about 1 to about 20° C. to a temperature of between about 300 and about 700° C.; 2) soaking at a temperature of between about 300 and 700° C. for from about 10 minutes up to about 12 hours to form a preform or finished product; and 3) controllably cooling the preform or finished product to a temperature below about 100° C. The non-oxidizing atmosphere may be provided by the introduction of inert or non-oxidizing gas into the "mold" at a pressure of from about 0 psi (i.e., free flowing gas), but more typically 200 psi, up to about 500 psi. The inert gas used may be any of the commonly used inert or non-oxidizing gases such as nitrogen, helium, argon, $CO_2$, etc.

It is generally not desirable that the reaction chamber be vented or leak during the heating and soaking operation. The pressure of the chamber and the increasing volatile content therein tends to retard further volatilization while the cellular product sinters at the indicated elevated temperatures. If the furnace is vented or leaks during soaking, an insufficient amount of volatile matter may be present to permit interparticle sintering of the coal particles thus resulting in the formation of a sintered powder as opposed to the desired cellular product. Thus, venting or leakage of non-oxidizing gas and generated volatiles is inhibited consistent with the production of an acceptable cellular product.

Additional more conventional blowing agents may be added to the particulate prior to expansion to enhance or otherwise modify the pore-forming operation.

The term "mold", as used herein is meant to define a mechanism for providing controlled, dimensional forming of the expanding coal. Thus, any chamber into which the coal particulate is deposited prior to or during heating and which, upon the coal powder attaining the appropriate expansion temperature, contains and shapes the expanding porous coal to some predetermined configuration such as: a flat sheet; a curved sheet; a shaped object; a building block; a rod; tube or any other desired solid shape can be considered a "mold" for purposes of the instant invention.

As will be apparent to the skilled artisan familiar with pressurized gas release reactions, as the pressure in the reaction vessel, in this case the mold increases, from 0 psi to 500 psi, as imposed by the non-oxidizing gas, the reaction time will increase and the density of the produced porous coal will increase as the size of the "bubbles" or pores produced in the expanded coal decreases. Similarly, a low soak temperature at, for example about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the carbon foams of the present invention in a wide variety of controlled densities, strengths etc. These results are graphically represented in FIG. 1 where the X axis is gas release, the Y axis is time and the individual curves represent different pressures of inert gas $P_1$, $P_2$, and $P_3$, different heat-up rates $HR_1$, $HR_2$, and $HR_3$, and $P_1 < P_2 < P_3$ and $HR_1 < HR_2 < HR_3$.

Cooling of the preform or product after soaking is not particularly critical except as it may result in cracking of the preform or product as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is in no way critical.

After expanding the high volatile bituminous coal particulate as just described the porous or foamed coal product is an open celled material. Several techniques have been developed for "sealing" the surface of the open celled structure to improve its adhesive capabilities for further fabrication and assembly of a number of parts. For example, a layer of a commercially available graphitic adhesive can be coated onto the surface and cured at elevated temperature or allowed to cure at room temperature to provide an adherent skin. Alternatively, the expansion operation can be modified by cooling the expanded coal product or preform rapidly, e.g., at a rate of 10° C./min or faster after expansion. It has been discovered that this process modification results in the formation of a more dense skin on the preform or product which presents a closed pore surface to the outside of the preform or product. At these cooling rates, care must be exercised to avoid cracking of the preform or product.

After expanding, the porous coal-based preform or product, i.e. carbon foam in accordance with the present invention, is readily machineable, sawable and otherwise readily fabricated using conventional fabrication techniques.

Subsequent to production of the preform or product as just described, the preform or product may be subjected to carbonization and/or graphitization according to conventional processes to obtain particular properties desirable for specific applications of the type described hereinafter. Ozonation may also be performed, if activation of the carbon foam would be useful in a final product application such as in filtering of air. Additionally, a variety of additives and structural reinforcers may be added to the coal-based preforms or products either before or after expansion to enhance specific mechanical properties such as fracture strain, fracture toughness and impact resistance. For example, particles, whiskers, fibers plates, etc. of appropriate carbonaceous or ceramic composition can be incorporated into the porous coal based preform or product to enhance its mechanical properties.

The open celled, coal-based preforms or products, ie. carbon foams, of the present invention can additionally be impregnated with, for example, petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties.

The cooling step in the expansion process results in some relatively minimal shrinkage on the order of less than about 5% and generally in the range of from about 2% to about 3%. This shrinkage must be accounted for in the production of near net shape preforms or final products of specific dimensions and is readily determinable through trial and error with the particular coal starting material being used. The shrinkage may be further minimized by the addition of some inert solid material such as coke particles, ceramic particles, ground waste from the coal expansion process etc. as is common practice in ceramic fabrication.

Carbonization, sometimes referred to as calcining, is conventionally performed by heating the preform or product under an appropriate inert gas at a heat-up rate of less than about 5° C. per minute to a temperature of typically between about 800° C. and about 1200° C. and soaking for from about 1 hour to about three or more hours. Appropriate inert gases are those described above that are tolerant of these high temperatures. The inert atmosphere is supplied at a pressure of from about 0 psi up to a few atmospheres. The carbonization/calcination process serves to remove non-carbon elements present in the preform or product such as sulfur, oxygen, hydrogen, etc.

Graphitization, commonly involves heating the preform or product either before or after carbonization at heat-up rate of less than about 10° C. per minute, preferably from about 1° C. to about 5° C. per minute, to a temperature of typically between about 1700° C. and about 3000° C. in an atmosphere of helium or argon and soaking for a period of less than about one hour. Again, the inert gas may be supplied at a pressure ranging from about 0 psi up to a few atmospheres.

The porous coal-based preforms or products resulting from processing in accordance with the foregoing procedures can be used in a broad variety of product applications, some, but not all, of which will now be broadly described.

Perhaps the simplest products that could be fabricated using the coal-based porous preforms or products of the present invention are various lightweight sheet products useful in the construction industry. Such products may involve the lamination of various facing materials to the surface of a planar sheet of the preform material using an appropriate adhesive. For example, a very light and relatively inexpensive wall board would simply have paper laminated to its opposing planar surfaces, while a more sophisticated curtain wall product might have aluminum sheet, polymer or fiber-reinforced polymer sheets or even stainless steel sheet laminated thereto. A wide variety of such products that have lightweight, low cost and adequate strength can easily be envisioned for wallboard, structural wallboard, bulkheads, etc. The materials of the present invention exhibit sound insulation and vibration resistance due to excellent sound and vibration damping properties, good thermal insulating properties (less than about 1 watt per meter K thermal conductivity).

Laminates of these materials may even be used to produce heating element incorporating members, since a graphitized core could serve as an electrical heating element when connected to an appropriate source of electrical energy.

Similar surface laminated porous preform core based products could also find use in the transportation industry where lighter and, especially fire retardant walls, bulkheads, containers, etc. are in constant demand. Such products would of course require that the expanded coal-based porous core be carbonized as described hereinabove prior to application of the exterior skins, if fire resistance or retardancy is desired.

Yet another product application for the carbon foams of the present invention is as a replacement for the ceramic foam filters currently applied in the filtering of molten metal such as aluminum for the removal of contaminating particulates also called inclusions. The current ceramic foam materials are relatively expensive and extremely friable. It is easily possible to produce a porous coal-based preform of the type described herein having an appropriate pore size and of the same size and shape as the ceramic foam filter using the above described fabrication process, to serve as a molten metal filter of this type. The cost of such a more robust, i.e., less friable, filter would be considerably less than that of a comparable ceramic foam filter.

Yet other product applications for the carbon foam materials of the present invention reside in the field of heat exchangers. In this application, the heat transfer properties of a graphitized porous coal-based material can be exploited to produce a heat exchanger capable of extracting heat from or adding heat to a fluid (gas or liquid) flowing through porous carbon foam pores. In this case, the coal-based porous product is joined to an appropriate heat transfer mechanism such as an aluminum skin.

As already alluded to, the products of the present invention can be produced in any solid geometric shape. Such production is possible using any number of modified conventional processing techniques such as extrusion, injection molding, etc. In each of such instances, the process must, of course, be modified to accommodate the processing characteristics of the starting material coal. For example, in extruding such products, as described below, the coal powder starting material is fed by an auger into an expansion chamber where it is expanded and from which it is extruded while still viscous. Upon exiting the extrusion die, the material is cooled to provide a solid shape of the desired and precalculated dimensions. To improve the efficiency, i.e., cycle time of the process, the Input material can be preheated to a temperature below the expansion point, e.g., below about 300° C., fed into the auger chamber where additional heat is imparted to the powder with final heating being achieved just before extrusion through the die.

Similar relatively minor process modifications can be envisioned to fabricate the carbon foams of the present invention in injection molding, casting and other similar conventional material fabrication processes.

The following examples will serve to illustrate the production of the carbon foams of the present invention.

Example 1

Figure 2:
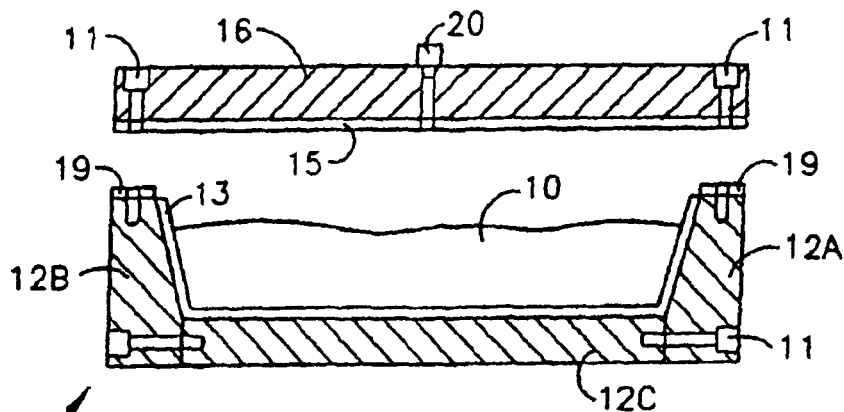
FIG. 2 is a cross-sectional view of a "mold" containing powdered coal prior to expansion in accordance with the process of the present invention.
Figure 3:
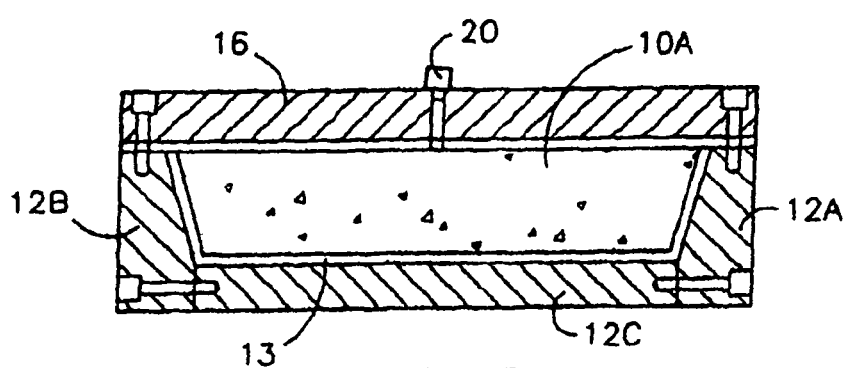
FIG. 3 is a cross-sectional view of the "mold" of FIG. 2 subsequent to expansion of the powdered coal in accordance with the process of the present invention.

As shown in FIG. 2, a layer 10 of comminuted bituminous coal having a free swell index of about 4 and ground to a particle size of about −60 mesh and about 2 inch deep is deposited in mold 12 equipped with a cover 16. Mold 12 is assembled from three individual pieces carbon or tool steel pieces, sides 12A and 12B and bottom 12C, all joined together by bolts 11 and lined with a ceramic glaze or spray applied ceramic lining 13. Cover 16 includes a similar interior ceramic lining 15 and is attached to sides 12A and 12B with bolts 17 in the final assembly prior to heating. Gaskets 19 are preferably used to insure a tight fit of cover 16 onto sides 12A and 12B. Cover 16 is optionally equipped with a sintered vent plug 20 to permit purging of the interior of mold 12 with non-oxidizing gas. This configuration, incorporating valve 20 also permits pressurization, if desired to control expansion speed and/or pore size in the final product as described hereinabove. Nitrogen gas is repeatedly introduced through valve 20 to assure that all oxygen in mold 12 is purged (generally 2-4 such purges have been found satisfactory) and to provide a one atmosphere pressure of nitrogen inside of mold 12. Mold 12 is then heated at a rate of from about 1 to about 10° C./min up to a temperature of about between about 450 and 600° C. and held at this temperature sufficient to devolatilize and sinter the cellular product (generally less than about one hour). This treatment results in the production of an open celled expanded carbon foam 10A as shown in FIG. 3. Mold 12 is then cooled to room temperature at a rate of less than about 10° C./min. to a temperature of 100° C.; any remaining pressure is then vented through valve 15 and the sample removed from mold 12 by disassembly of mold 12 by disengagement of bolts 11. The carbon foam product 10A is thereby readily removed from mold 14 and is subsequently sawed to the desired dimensions.

Product 10A has density of between about 0.4 and about 0.6 g/cm$^3$ and demonstrates a compressive strength on the order of between about 2000 and 6000 psi. Thermal conductivity as determined by the guarded heat flow method is below about 1.0 W/m/K.

Example 2

Figure 4:
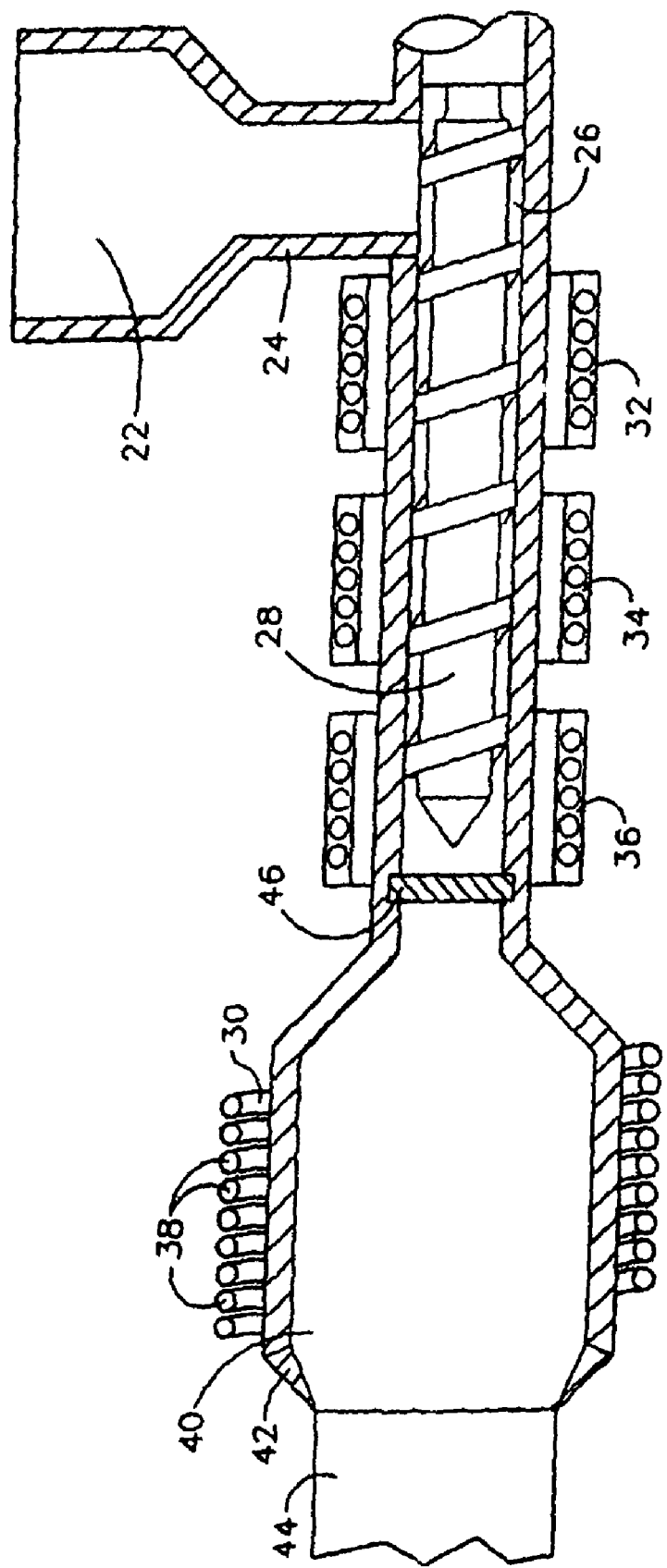
FIG. 4 is a cross-sectional diagram of an extruder suitable for the production of coal-based porous products in accordance with the present invention.

An application of the process for production of the carbon foam of the present invention using an extrusion process is depicted in FIG. 4. As shown in that figure, comminuted bituminous coal 22 of a particle size of about −80 mesh is introduced via hopper 24 into chamber 26 equipped with auger 28 that moves particulate coal 18 through chamber 26 and into expansion chamber 30. Chamber 26 Is heated by means of a series of barrel heaters 32, 34 and 36 to impart a temperature of less than about 300° C. to particulate coal 18 as it approaches and enters expansion chamber 26. As is conventional practice in extrusion, chamber 26 is divided into a feed section, a compression section and a metering section each defined roughly by the location of barrel heaters 32, 34 and 36 and imparted by the tapered shape of auger 28. Expansion chamber 30 is maintained under a non-oxidizing atmosphere and at a temperature of about 450° C. by means of barrel heater 38. Particulate coal 18 expands within chamber 26 to form expanded coal product 40 and, while still viscous, expanded coal product 40 is extruded through a die 42 to form solid shaped product 44 upon cooling to room temperature. Solid shaped product 44 is a carbon foam and demonstrates properties similar to those obtained from the product described in Example 1.

At the point where particulate coal 22 exits chamber 26 and enters expansion chamber 30, chamber 26 is preferably equipped with a breaker plate 46 that serves to break up any large agglomerates of particulate coal 22 that may have formed in transit within chamber 26.

The carbon foam extrudate 44 may have virtually any solid shape ranging from a large flat panel 4'×8' as might be used as the core of the above-described building panel to square shapes, rounds, channels and even tubular shapes if a bridge die is used in the extrusion process. Almost any shape that can be achieved with plastic or metal extrusion can be similarly obtained using the described process.

As the invention has been described, it will be apparent to those skilled in the art that the same may be varied in many ways without departing from the spirit and scope of the invention. Any and all such modifications are intended to be included within the scope of the appended claims.

What is claimed is:

1. A carbon foam having an ash content greater than about 2% by weight, a density ranging from about 0.1 g/cc to about 0.8 g/cc, and a B.E.T. surface area of less than about 5 $m^2/g$ produce by the direct foaming of high-volatile bituminous coal particulate containing from about 35% to about 45% by weight volatile matter in a non-oxidizing atmosphere.

2. The carbon foam of claim 1, having an ash content greater than about 2% by weight and less than about 15% by weight.

3. The carbon foam of claim 1, having an ash content greater than about 10% by weight and less than about 15% by weight.

4. The carbon foam of claim 1, having an ash content greater than about 3% by weight and less than about 7% by weight.

5. The carbon foam of claim 1, having an ash content greater than about 10% by weight and less than about 15% by weight.

6. The carbon foam of claim 1, wherein said B.E.T. surface area is less than about 2 $m^2/g$.

7. The carbon foam of claim 1, wherein said ash comprises oxides of aluminum and silicon.

* * * * *